United States Patent [19]

Marshall et al.

[11] B 4,014,789
[45] Mar. 29, 1977

[54] SEPARATION OF LIQUID PHASES
[75] Inventors: Walter R. Marshall, Bloomfield;
Richard A. Gregory, Jr., Belle Mead;
Richard H. Handwerk, South
Somerville, all of N.J.
[73] Assignee: Union Carbide Corporation, New York, N.Y.
[22] Filed: May 2, 1973
[21] Appl. No.: 356,470
[44] Published under the second Trial Voluntary Protest Program on March 23, 1976 as document No. B 356,470.
[52] U.S. Cl. .................................. 210/84; 210/322
[51] Int. Cl.² ........................................ B01D 21/26
[58] Field of Search ............... 210/83, 84, 65, 322, 210/512; 23/270 R

[56] References Cited
UNITED STATES PATENTS

| | | | |
|---|---|---|---|
| 2,190,596 | 2/1940 | Dorr | 210/49 |
| 2,659,761 | 11/1953 | Frevel et al. | 210/179 X |
| 3,233,742 | 2/1966 | Shaines et al. | 210/83 X |
| 3,288,443 | 11/1966 | Lynch et al. | 259/9 |
| 3,644,103 | 2/1972 | Yoon et al. | 23/270 R |
| 3,687,288 | 8/1972 | Lynch et al. | 210/84 |
| 3,705,099 | 12/1972 | Hunter | 210/322 X |
| 3,718,259 | 2/1973 | Harrison | 210/84 X |

*Primary Examiner*—Frank A. Spear, Jr.
*Attorney, Agent, or Firm*—Gerald R. O'Brien, Jr.

[57] ABSTRACT

Process is disclosed for effecting phase separation of relatively high and low viscosity immiscible liquids comprising maintaining, between inner means in relative rotational movement with outer sleeve means, at least one zone of increased pressure constriction and of decreased pressure constriction; feeding a multiphase mixture of relatively low viscosity and relatively high viscosity liquids to the interior of said sleeve means between said zones of increased and decreased pressure constriction; and withdrawing said high viscosity liquid and said low viscosity liquid from the vicinities of said zones of increased and decreased pressure constriction, respectively.

4 Claims, 7 Drawing Figures

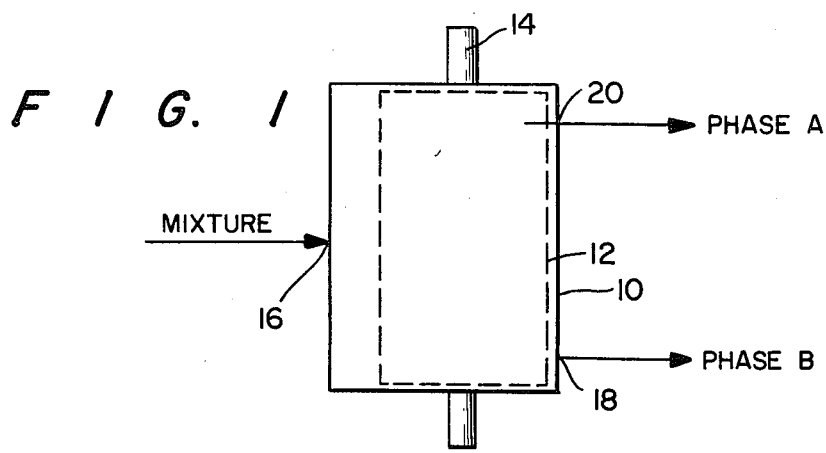
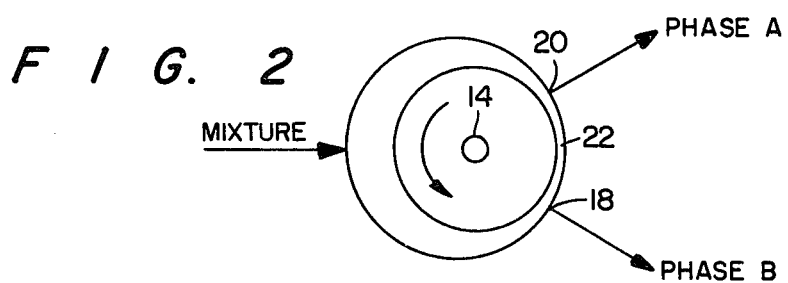
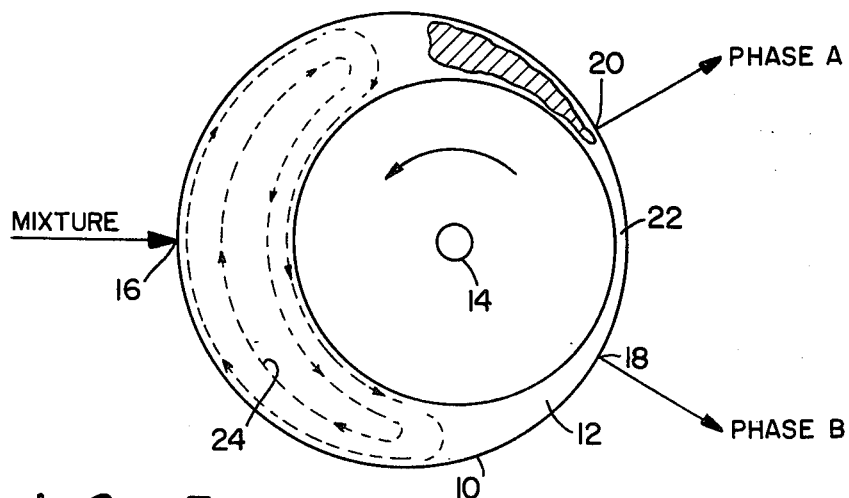

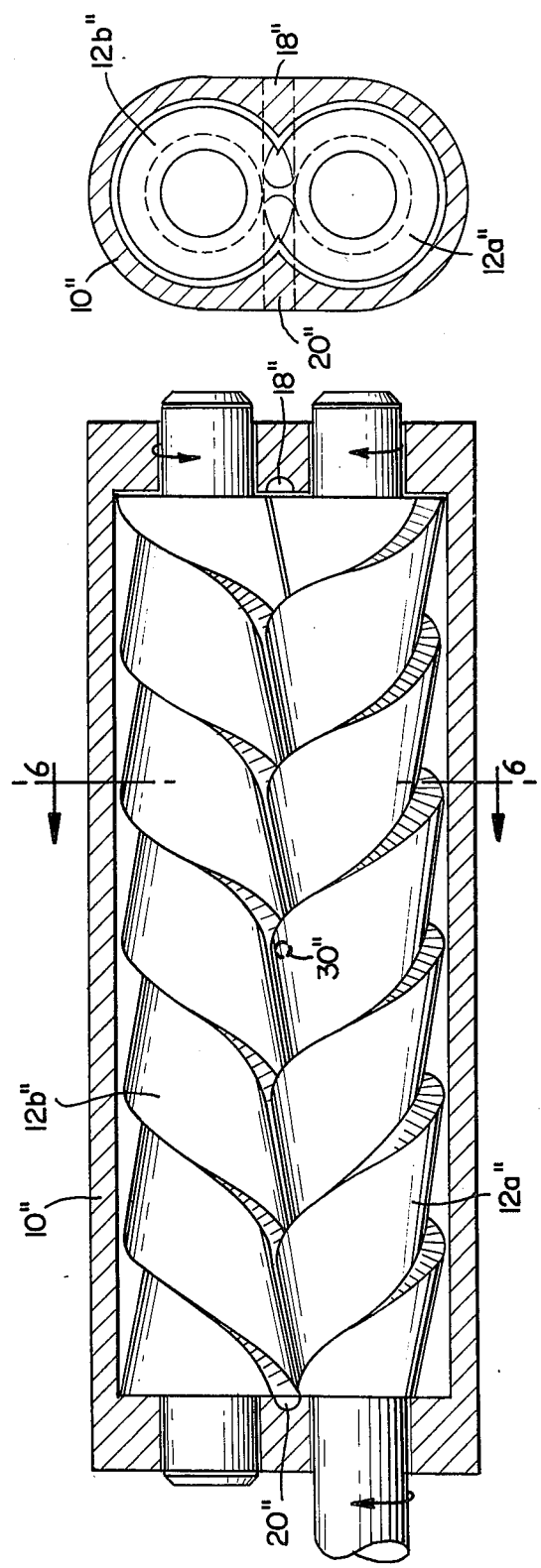

SEPARATION OF LIQUID PHASES

The present invention relates to the separation of liquid phases of a mixture and more particularly to method for separating immiscible liquid phases.

The necessity to effect such separations arises in many areas, for example in the production of synthetic organic polymers. Polymer is normally produced in a reaction mixture from which it must be isolated. Unreacted raw materials, solvents and oddments must be removed from the polymer in order to fully develop its desired properties. One technique is to wash out undesirable ingredients with an appropriate solvent or water. This requires subsequent separation of the wash, and decantation is one method used. However, decantation is inefficient with near-matching gravities and with extremely high viscosities, often associated with polymers. As a result high polymer dilution and high solvent ratios are often necessary. Resulting techniques can generate excessive volumes, large equipment and high costs.

During the late 1960s emergence of ecology problems was highlighted by oil spills at sea. Recovery and disposal developments generated a demand for oil-water separators to cope with base oil spills.

In considering liquid phase separation problems such as these, it was conceived that process and apparatus could be devised in which the viscosity differential between two immiscible liquid phases could be harnessed to separate the mixed phases.

While decantation often proceeds ideally under static mass flow equilibrium conditions, it has been found that when a two-phase liquid system is relaxed and isolated from externally imposed flow influences, viscosity differences in the liquids become inoperative and cannot generate motion; shear or separating action, while gravity or centrifugal forces continue to operate.

Thus, a phase separation based on viscosity differential between two immiscible liquid phases requires flow control.

Accordingly, it is the prime object of the present invention to provide a method for the separation of relatively high and low viscosity immiscible liquids based on the viscosity differential between the liquids.

Other aims and advantages of the invention will be apparent from the following description and appended claims.

As employed herein, the following terms are understood to have the following meanings:

"Liquids" are deemed to include all natural and synthetic organic and inorganic fluids which are in liquid form under the conditions of temperature and pressure at which the separation is to be effected.

"Immiscible Liquids" means liquids which are not truly mixable but are imperfect mixtures or dispersions of phases which are capable of being converted to continuous phases which will be susceptible to separation based on viscosity differential between the phases in accordance with the present invention.

"Mixture or Dispersion" means those imperfect mixtures or dispersions of the type as defined in pages 437–450 of the text "Liquid Extraction" by R. E. Treybal, 2nd Edition, McGraw-Hill (1963), the disclosure of which is incorporated herein by reference, the phases of such mixtures or dispersions being capable of coalescence from a continuous phase to enable separation.

"Relatively high viscosity" means the viscosity of a higher viscosity component phase of a multi-phase liquid mixture which is at least 100 times the viscosity of the next lower component phase of the mixture.

"Relatively low viscosity" means the viscosity of the lower viscosity component phase of the multi-phase liquid measure.

"Relative viscosity ratio" means the ratio between the viscosity of the higher viscosity component phase and the lower viscosity component phase of the multi-phase liquid mixture.

"Increased pressure constriction zone" means a zone developed and maintained in a separation system which is increased in pressure by operation of the process and apparatus of the invention to a higher value than the mean pressure maintained in the system.

"Decreased pressure constriction zone" means a zone developed and maintained in a separation system which is decreased in pressure by operation of the process and apparatus of the invention to a value lower than the mean pressure maintained in the system.

"Hydraulically filled system" means that the separation system is hydraulically filled in its entirety from inlet to outlet with multi-phase liquid mixture, relatively high viscosity liquid and/or relatively low viscosity liquid.

In accordance with the process of the invention, phase separation of relatively high and low viscosity immiscible liquids is effected by providing and maintaining, between inner means in relative rotational movement with an outer sleeve or housing means, at least one zone of increased pressure constriction and of decreased pressure constriction; feeding a multi-phase mixture of relatively high viscosity and relatively low viscosity liquids to the interior of said sleeve means between the zones of increased and decreased pressure constriction; and withdrawing said high viscosity liquid and said low viscosity liquid from the vicinities of said zones of increased and decreased pressure constriction, respectively.

More specifically, the process of separation of such relatively high and low viscosity liquids may be carried out by providing and maintaining an eccentrically-mounted inner means of generally circular cross-section in relative rotational movement with an outer sleeve means of generally circular cross-section to develop at least one zone of increased pressure constriction at one side of said inner means and at least one zone of decreased pressure constriction at the other side of said inner means; feeding a multi-phase mixture of relatively high viscosity and relatively low viscosity liquids to the interior of said sleeve means between said zones of increased and decreased pressure constriction; withdrawing said high viscosity liquid and said low viscosity liquid from the vicinities of said zones of increased and decreased pressure constriction; and maintaining such feeding and withdrawing at such rates as to establish an equilibrium operating condition, such that a substantially hydraulically filled condition is maintained within the system (which may include some entrained gas bubbles). Any such gas phase in the mixture should be removed by conventional bleeding means or with the low viscosity phase in the operation of the apparatus of the invention.

In accordance with the apparatus for carrying out the invention, phase separation of relatively high and low viscosity immiscible liquids is effected by providing and maintaining a rotating inner means of generally circular cross section mounted within outer housing means of generally circular cross-section to develop at least one zone of increased pressure constriction at one zone, region or series of regions of said inner member and at least one zone of decreased pressure constriction at another zone, region or series of regions of said inner means; means for feeding a multi-phase mixture of relatively high viscosity and relatively low viscosity liquids to the interior of said housing means between said zones of increased and decreased pressure constriction; and means for withdrawing said high viscosity liquid and said low viscosity liquid from the vicinities of said zones of increased and decreased pressure constriction, respectively.

In the drawings:

FIG. 1 is a schematic elevational view of liquid phase separation apparatus for practicing the invention;

FIG. 2 is a schematic sectional view of the separation apparatus of FIG. 1;

FIG. 3 is an enlarged schematic sectional view similar to FIG. 2 additionally showing liquid flow circulation within the separation apparatus;

FIG. 5 is an elevational, cross-sectional view of a further type of liquid phase separation apparatus;

FIG. 6 is a cross-sectional view of the embodiment of apparatus of FIG. 5, taken along the line 6—6.

Figure 4:
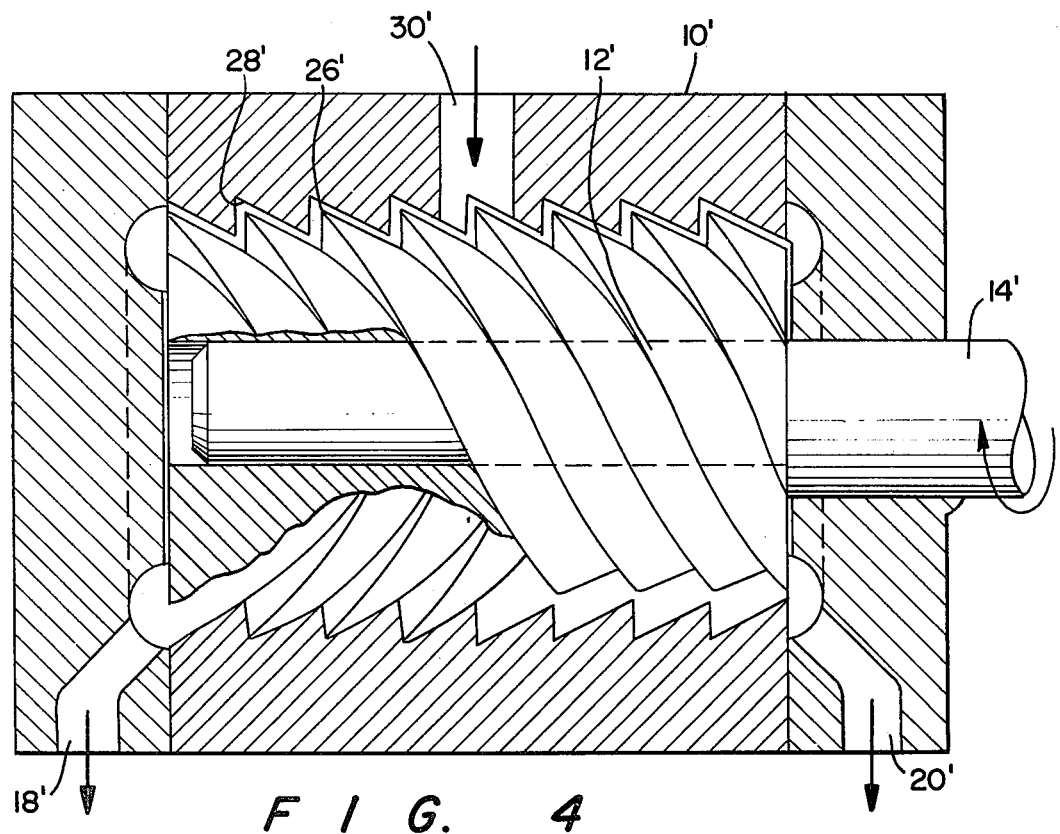
FIG. 4 is an elevational, cross-sectional view of another type of liquid phase separation apparatus.

Referring specifically to FIGS. 1 – 3 of the drawings, apparatus is provided for effecting phase separation of relatively high and low viscosity immiscible liquids comprising outer housing member 10 having positioned therein rotating inner member 12 of generally circular cross-section and driven by shaft 14 which is eccentrically positioned with respect to the central axis of outer housing member 10. Mixture inlet means 16 is provided centrally of the length of outer housing member 10 and high and low viscosity phase outlet means 18 and 20, respectively, are positioned on opposite sides of the close-clearance bite (or nip) 22 formed between outer housing member 10 and rotating inner member 12.

In the operation of the embodiment of apparatus of FIGS. 1 – 3, the mixture of Phase A and Phase B liquids is introduced through inlet means 16. The relative rotation between the rotating inner member and the outer housing member produces the circulatory flow of the mixture, as indicated by the dotted flow lines 24 of FIG. 3. At the same time, the relative rotation produces a region of relatively higher shear and pressure in the vicinity of outlet means 18 and a relatively lower shear and pressure in the vicinity of outlet means 20. There is a consequent migration of the relatively high viscosity liquid phase to the region of relatively high shear and pressure and a comparable migration of the relatively low viscosity liquid phase to the region of relatively low shear and pressure. The resulting phase separation of the relatively high and low viscosity immiscible liquids is thus effected by the withdrawal of the relatively high viscosity Phase B through outlet means 18 and the simultaneous withdrawal of relatively low viscosity Phase A through outlet means 20.

Another type of apparatus, as shown in FIG. 4 of the drawings, comprises outer housing means 10' having eccentrically-mounted, orbiting inner member 12' driven by shaft 14'. Inner member 12' is an orbiting buttress screw having threads 26' capable of mating with threads 28' positioned on the interior bore surface of outer housing means 10'.

In this embodiment of separation apparatus, the mixture of relatively high and low viscosity liquids is introduced through inlet means 20'. The orbiting action of the inner member, relative to the outer housing, produces the variations in shear and pressure which cause the migration of the relatively high viscosity phase liquid to the left of the apparatus where it is discharged through outlet means 18' and the simultaneous migration of the relatively low viscosity phase liquid to the right of the apparatus where it is discharged through outlet means 20'.

A further embodiment of apparatus is shown in FIGS. 5 – 6 of the drawings. As there shown, outer housing means 10'', having a smooth, cylindrical inner bore surface, encloses twin counter-rotating, intermeshing buttress thread screws 12''a and 12''b. Mixture inlet means 30'' and relatively high and low viscosity outlet means 18'' and 20'' are positioned as in the embodiment of FIG. 4.

Figure 7:
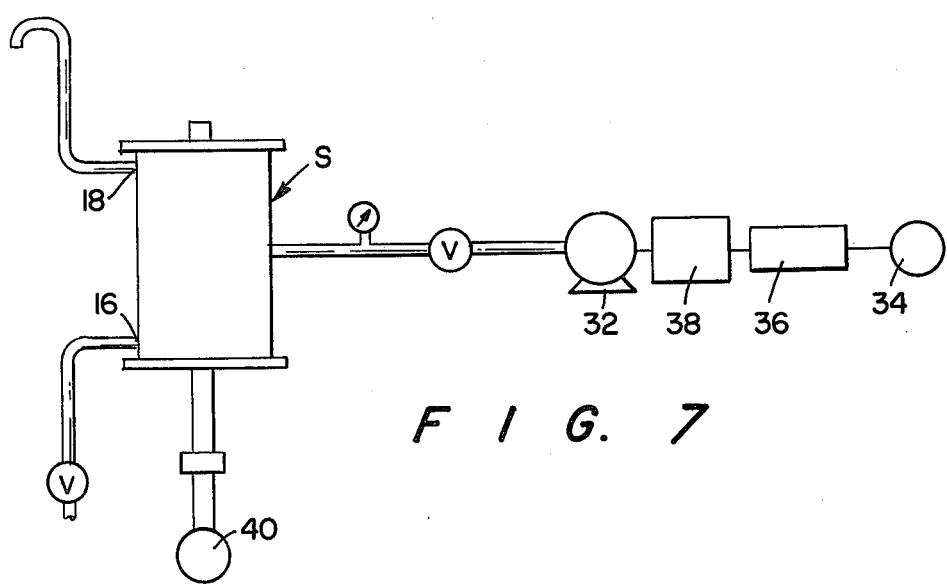
FIG. 7 is a schematic representation of a complete separation system for employment with the invention.

Referring specifically to the schematic representation of a complete separation system, as set forth in FIG. 7 of the drawings, continuous phase separation apparatus is provided. The mixture of phases to be separated is fed by pump 32, driven by a motor 34 through drive means 36 and gear reducer 38, to the separator S which is of the type shown in FIGS. 1 – 3 of the drawings and which is driven by means of motor 40. The mixture to be separated enters the separator S through inlet means 16 and the separated phases are withdrawn through outlet means 18 and 20, respectively.

One such continuous separator system was employed to separate a feed solution consisting of 30% water dispersed in a simple phase polymer solution consisting of three components (dioctyl phthalate, polystyrene and dichlorobenzene). Separation was carried on for over thirty hours of continuous operation. The separator consisted of a transparent outer cylinder of plastic and an inner rotating cylinder of steel. The outer cylinder had a 1.9-inch diameter. The cylinders were eccentrically aligned by forming a line of contact separating the two exit means. The inlet means was then 180° from the line of contact and half-way between the ends of the cylinder. In this example, a vertical arrangement of separator was employed in order to allow any entrained air bubbles to escape without interfering with the desirable liquid flow patterns.

In the other examples set forth in the following table, separations were effected employing an orbiting buttress thread separator of the type shown in FIG. 4 of the drawings. This separator employed a 1⅛-inch diameter screw and effected the separation of two samples of No. 6 fuel oil and water mixture, one sample having a 6,000 cps viscosity and the other having a 3,800 cps viscosity.

TABLE

| Water Rate (lbs./hr.) | Feed Oil Content (wt. %) | VAPS rpm. | % Oil in Water Discharge |
|---|---|---|---|
| 6.6 | 2 | 40 | 0.030 |
| 6.6 | 2 | 60 | 0.012 |
| 6.6 | 2 | 80 | 0.090 |
| 6.6 | 2 | 100 | 0.260 |
| 13.2 | 1 | 40 | 0.081 |

TABLE-continued

| Water Rate (lbs./hr.) | Feed Oil Content (wt. %) | VAPS rpm. | % Oil in Water Discharge |
| --- | --- | --- | --- |
| 13.2 | 1 | 60 | 0.063 |
| 13.2 | 1 | 80 | 0.060 |
| 13.2 | 1 | 100 | 0.063 |

A wide variety of other mixtures of relatively high and relatively low viscosity liquid phases were separated employing a variety of separator devices, all embodying the separation process of the present invention. It has been found that the rate of shear is an important variable in control of viscosity actuated phase separation in accordance with the present invention. A low or moderate shear rate regime (e.g. of the order of magnitude of from about 5 to 200 reciprocal seconds) is desirable for most effective separation. High speed equipment which produces high shear rates (e.g. higher than an order of magnitude of about 200 reciprocal seconds) promotes dispersion and works against separation.

The outer housing member of the separator may possess a wide variety of inner bore surface shapes, as illustrated by the cylindrical surface of embodiment of FIGS. 1 – 3 and the thread screw surface of the embodiment of FIG. 4. Conical inner bore surfaces as well as other shaped surfaces may be employed.

The rotating inner means may similarly have any one of a wide variety of surfaces in addition to the cylindrical and thread screw surfaces illustrated in the embodiments of the drawings. It may consist of a single rotating member or of a plurality of non-intermeshing members or intermeshing screw members.

What is claimed is:

1. The process for effecting phase separation of relatively high and low viscosity immiscible liquids comprising: providing and maintaining, between inner means in relative rotational movement with outer sleeve means, at least one zone of increased pressure constriction and of decreased pressure constriction; feeding a multi-phase mixture of relatively high viscosity and relatively low viscosity liquids to the interior of said sleeve means between said zones of increased and decreased pressure constriction; and withdrawing said high viscosity liquid and said low viscosity liquid from the vicinities of said zones of increased and decreased pressure constriction, respectively.

2. The process in accordance with claim 1, wherein said zones of increased pressure constriction and decreased pressure constriction are provided by maintaining in said multiphase mixture a shear rate regime of the order of from about 5 to 200 reciprocal seconds.

3. The process for effecting phase separation of relatively high and low viscosity immiscible liquids comprising: providing and maintaining an eccentrically-mounted, generally cylindrical inner means in relative rotational movement with outer sleeve means to develop at least one zone of increased pressure constriction at one side of said inner means and at least one zone of decreased pressure constriction at the other side of said inner means; feeding a multi-phase mixture of relatively high viscosity and relatively low viscosity liquids to the interior of said sleeve means between said zones of increased and decreased pressure constriction; withdrawing said high viscosity liquid and said low viscosity liquid from the vicinities of said zones of increased and decreased pressure constriction, respectively; and maintaining such feeding and withdrawing at such rates as to establish an equilibrium operating condition such that a substantially hydraulically filled condition is maintained within the system.

4. The process in accordance with claim 3, wherein said zones of increased pressure constriction and decreased pressure constriction are provided by maintaining in said multiphase mixture a shear rate regime of the order of from about 5 to 200 reciprocal seconds.

* * * * *